(12) United States Patent
Schönhoff et al.

(10) Patent No.: US 7,037,022 B2
(45) Date of Patent: May 2, 2006

(54) BALL-AND-SOCKET JOINT

(75) Inventors: Stefan Schönhoff, Osnabrück (DE); Markus Fischer, Steinfeld (DE)

(73) Assignee: ZF Lemförder Metallwaren AG, Stemwede-Dielingen (DE)

(*) Notice: Subject to any disclaimer, the term of this patent is extended or adjusted under 35 U.S.C. 154(b) by 0 days.

(21) Appl. No.: 10/450,936

(22) PCT Filed: Oct. 8, 2002

(86) PCT No.: PCT/DE02/03777

§ 371 (c)(1),
(2), (4) Date: Jun. 17, 2003

(87) PCT Pub. No.: WO03/033921

PCT Pub. Date: Apr. 24, 2003

(65) Prior Publication Data

US 2004/0047677 A1    Mar. 11, 2004

(30) Foreign Application Priority Data

Oct. 9, 2001   (DE) ................................ 101 49 609

(51) Int. Cl.
*F16C 11/06* (2006.01)

(52) U.S. Cl. .................... 403/114; 403/122; 403/124; 403/125

(58) Field of Classification Search ................ 403/76, 403/114, 122, 124, 125, 133, 135, 140; 280/93.51, 280/93.511
See application file for complete search history.

(56) References Cited

U.S. PATENT DOCUMENTS

| 4,055,385 A | * | 10/1977 | Bjors ........................ 411/378 |
| 4,466,755 A | * | 8/1984 | Smith ......................... 403/36 |
| 2003/0099505 A1 | * | 5/2003 | Kincaid et al. ............. 403/133 |

FOREIGN PATENT DOCUMENTS

| DE | 24 41 914 A1 | 3/1976 |
| DE | 24 41 915 A1 | 3/1976 |
| DE | 30 00 764 A1 | 9/1980 |
| DE | 41 08 488 A1 | 9/1992 |
| DE | 42 24 895   | * 2/1994 |

(Continued)

Primary Examiner—Daniel P. Stodola
Assistant Examiner—Michael P. Ferguson
(74) Attorney, Agent, or Firm—McGlew & Tuttle PC

(57) ABSTRACT

A ball-and-socket joint, preferably for chassis suspensions and/or steering mechanisms of motor vehicles, is presented, which has a ball pivot pin (1), which is accommodated rotatably and tiltably in a joint housing (8) with one of its free ends with a spherical joint area (3). The other free end of the ball pivot pin (1) is fixed to a body part. The ball-and-socket joint has a stop device for limiting the tilting movement of the ball pivot pin (1) in the joint housing (8), which comprises a stop element, which is arranged in the bottom area (11) of the joint housing (8) rotationally symmetrically to the longitudinal axis of the sphere and cooperates with the end-side joint area (6) of the ball pivot pin (1). Corresponding to a first embodiment variant, the ball-and-socket joint has an arch projecting spherically over the bottom area (11) of the joint housing (8) as a stop element; a second solution variant provides for the stop element in the bottom area (11) of the joint housing (8) to have a hollow spherical shape, the radius of the hollow spherical shape being greater than the radius of the spherical shape of the joint area of the ball pivot pin (1).

14 Claims, 4 Drawing Sheets

FOREIGN PATENT DOCUMENTS

| | | |
|---|---|---|
| DE | 42 24 895 A1 | 2/1994 |
| DE | 0 593 373 A1 | 4/1994 |
| DE | 42 44 886 C2 | 2/1996 |
| EP | 0 276 420 A2 | 6/1988 |

* cited by examiner

BALL-AND-SOCKET JOINT

FIELD OF THE INVENTION

The present invention pertains to a ball-and-socket joint preferably for chassis suspensions and/or steering mechanisms of motor vehicles with a ball pivot pin, which is accommodated rotatably and tiltably in a joint housing with a ball joint area at one of its free ends and which is fixed statically to a body part with a pivot area located at its other free end, and with a stop device for limiting the tilting movement of the ball pivot pin in the housing, having a stop element, which is arranged rotationally symmetrically to the longitudinal axis of the ball-and-socket joint in the bottom area of the joint housing and cooperates with the end-side joint area of the ball pivot pin.

BACKGROUND OF THE INVENTION

Such a ball-and-socket joint is known especially from DE 42 44 886 C2. The angular mobility between the joint head and the joint housing of the ball-and-socket joint disclosed in that document is limited in that document by a stop device, which comprises a rotationally symmetrical, truncated cone-shaped stop on the housing, with which stop a counterstop formed by a corresponding recess in the joint head is associated at a spaced location.

Even though a stop element of such a design has proved, in principle, to be successful, it nevertheless has the drawback that in case of contact between the ball pivot pin and the truncated cone-shaped stop present on the housing, the bearing shell is partially subject to a very high load in the upper area facing the pivot area as a consequence of a developing lever action, which may lead to premature wear and a reduction of the overall service life of the ball-and-socket joint.

This is especially disadvantageous when the ball-and-socket joints with the possibility of the prior-art angular deflection limitation are loaded by the spring force and must bear the weight of the wheel carrier and brake disk in the fully deflected state of the vehicle.

SUMMARY OF THE INVENTION

The object of the present invention is therefore to improve a ball-and-socket joint of the above mentioned type such that premature wear of components that are important for the function, e.g., the bearing shell of the ball-and-socket joint, does not develop even under extreme load conditions, i.e., to provide a ball-and-socket joint in which the stop device permits a more uniform surface pressure between the ball pivot pin and the bearing shell for deflecting the ball pivot pin. At the same time, the manufacture of such a ball-and-socket joint shall become simpler and consequently less expensive.

According to one aspect of the present invention a ball-and-socket joint is provided, preferably for chassis suspensions and/or steering mechanisms of motor vehicles. The ball-and-socket joint has a ball pivot pin accommodated rotatably and tiltably in a joint housing with a ball joint area at one of its free ends fixed statically to a body part and with a pivot area located at its other free end. A stop device is provided for limiting the tilting movement of the ball pivot pin in the housing. The stop device has a stop element, which is arranged rotationally symmetrically to the longitudinal axis of the ball-and-socket joint in the bottom area of the joint housing and cooperates with the end-side joint area of the ball pivot pin. The stop element is provided as a convexly curved arch projecting preferably spherically over the bottom of the housing bottom.

According to another aspect of the present invention a ball-and-socket joint is provided, preferably for chassis suspensions and/or steering mechanisms of motor vehicles. The ball-and-socket joint has a ball pivot pin accommodated rotatably and tiltably in a joint housing with a ball joint area at one of its free ends fixed statically to a body part and with a pivot area located at its other free end. A stop device is provided for limiting the tilting movement of the ball pivot pin in the housing. The stop device has a stop element, which is arranged rotationally symmetrically to the longitudinal axis of the ball-and-socket joint in the bottom area of the joint housing and cooperates with the end-side joint area of the ball pivot pin. The stop element is provided with a concave curvature, preferably a hollow spherical shape at the housing bottom. The radius of the hollow spherical shape is greater than the radius of the spherical shape of the joint area of the ball pivot pin.

It is achieved through the technical solutions proposed that the spherical area of the ball pivot pin is raised during contact between this and the stop element designed according to the present invention, and the ball pivot pin is pressed uniformly to the upper end of the bearing shell facing the pivot area due to the raising. Another advantage of the solutions according to the present invention is that the ball pivot pin does not require any additional processing as a counterelement for the stop of the stop device at its joint ball-side end, at which a flattened area is present for manufacturing technical reasons. Thus, the same ball pivot pins can be used for ball-and-socket joints with and without stop device, which offers considerable advantages in terms of both the manufacturing technology and stocking.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
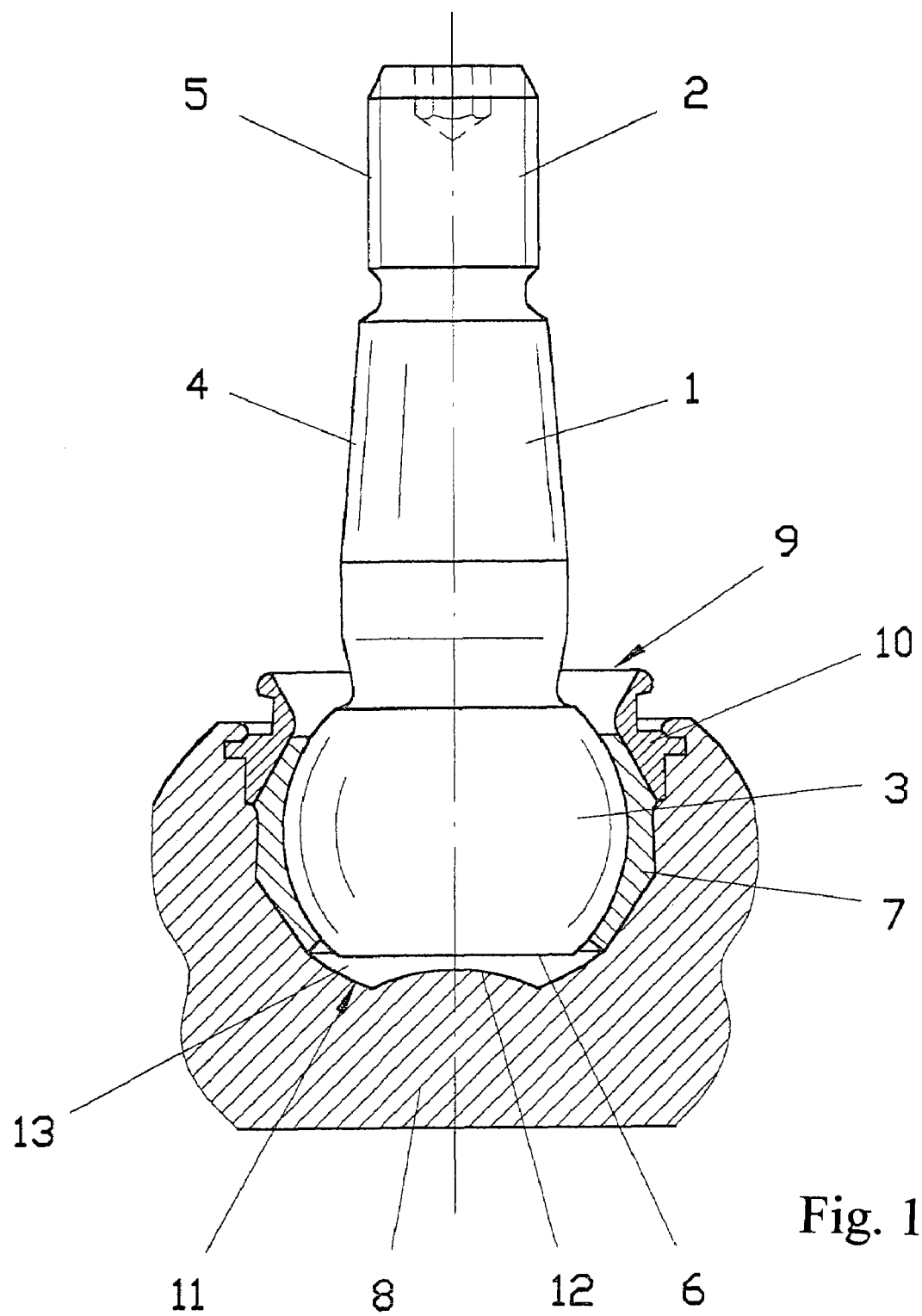
FIG. 1 is a sectional view through a ball-and-socket joint with a stop device according to a first solution disclosed.

Referring to the drawings in particular, the ball-and-socket joint shown in FIG. 1 comprises essentially a ball pivot pin 1, which has a pivot area 2 as well as a ball joint area 3. The pivot area 2 is provided with a conical mount 4, by means of which the ball pivot pin 1 can be statically connected to a body part and can be fixed on the body part by the threaded part 5 at the free end of the pivot area 2. The ball joint area 3 has an essentially spherical shape and has a flattened area 6 caused by the manufacturing technology used to form it. This flattened area 6 is at its free end facing away from the pivot area 2. The ball joint area 3 is accommodated in a bearing shell 7, which is in turn fixed in a recess of a joint housing 8. The recess for the bearing shell 7 is designed as a blind hole with an opening 9, through which the bearing shell 7 can be introduced into the joint housing 8 together with the joint area 3 of the ball pivot pin 1. Once the components have been accommodated in the joint housing 8, the joint housing 8 is closed by a closing ring 10, as a result of which the bearing shell 7 is fixed in the axial longitudinal direction of the ball-and-socket joint.

Figure 2:
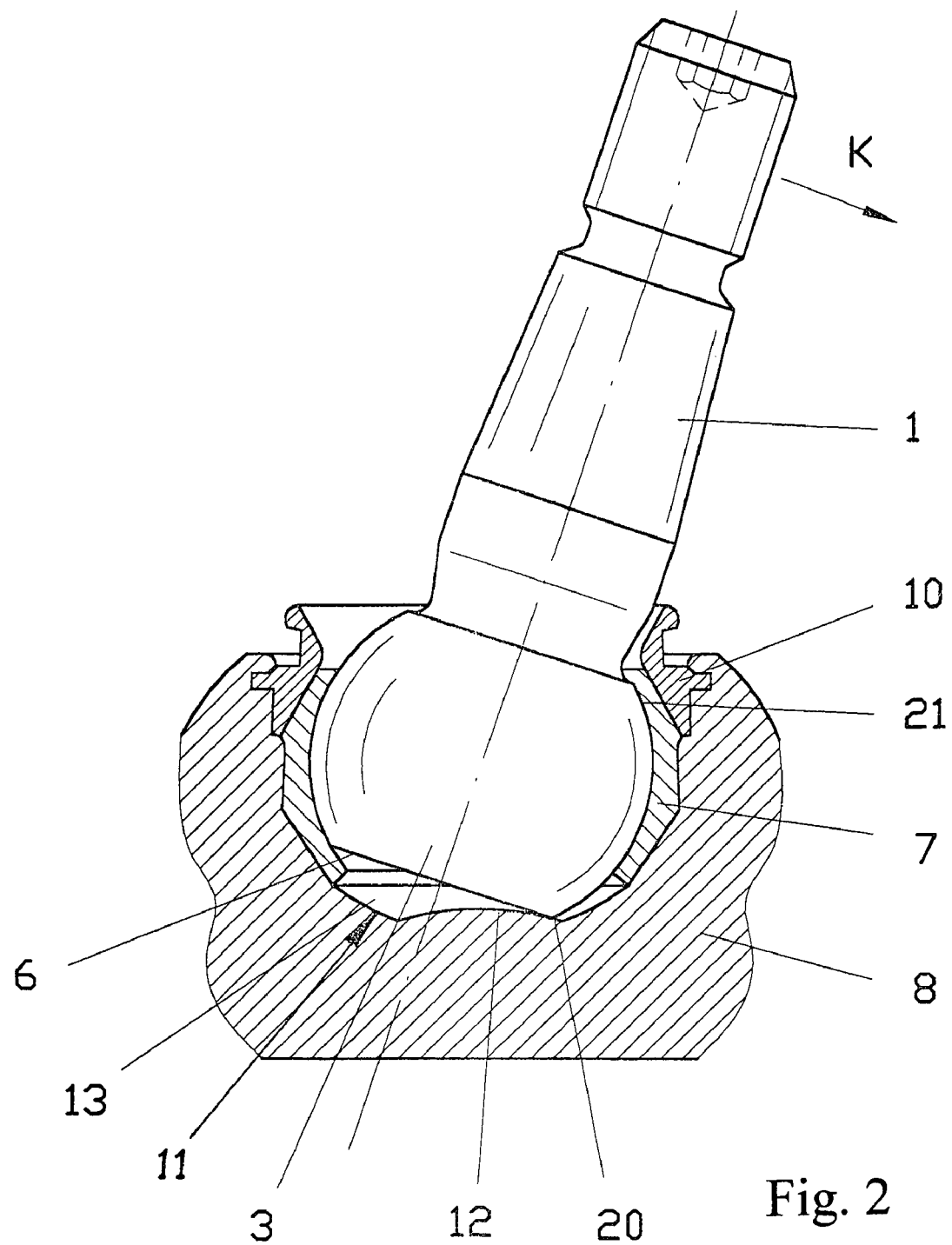
FIG. 2 is a sectional view through the ball-and-socket joint from FIG. 1 in the deflected state.

As can be clearly recognized from FIG. 1, the blind hole-like mounting hole in the joint housing 8 has a bottom area 11, which has a rotationally symmetrical arch 12 in the form of a ball surface projecting spherically in the direction of the flattened area 6 of the ball pivot pin 1. In case of a normal deflection of the ball pivot pin 1, an air gap 13 is present between the flattened area 6 and the surface of the arch 12. If the ball pivot pin 1 is greatly tilted within the bearing shell 7, as can be recognized from the view in FIG. 2, the air gap 13 decreases on one side until the flattened area 6 of the ball pivot pin 1 comes into contact with the arch 12 of the bottom area 11 in the blind hole of the joint housing 8 at the contact point 20. A further movement of the ball pivot pin 1 in the direction of arrow K leads to a displacement of the point 20 along the arch 12 and automatically to the raising of the ball pivot pin 1. The raising brought about by the arch 12 leads at the same time to a migration of the contact area 21 between the joint area 3 and the bearing shell 7 in the upper area of the closing ring 10. A punctiform load on the upper side of the bearing shell, which side is located in the area of the closing ring 10, is thus avoided in different tilted positions of the ball pivot pin 1, so that a special situation in terms of wear can be ruled out in this area despite the high load and the great tilting deflection of the ball pivot pin 1. The service life of the ball-and-socket joint according to the present invention shown in FIGS. 1 and 2 is thus prolonged. At the same time, it can be seen in FIGS. 1 and 2 that the stop device comprises, in principle, the arch 12 in the bottom area 11 of the joint housing, whereas the ball pivot pin 1 has the flattened area 6 at the end of the joint area 3 in the conventional manner and a special adaptation, as is necessary in the stop devices known from the state of the art, can thus be eliminated.

Figure 3:
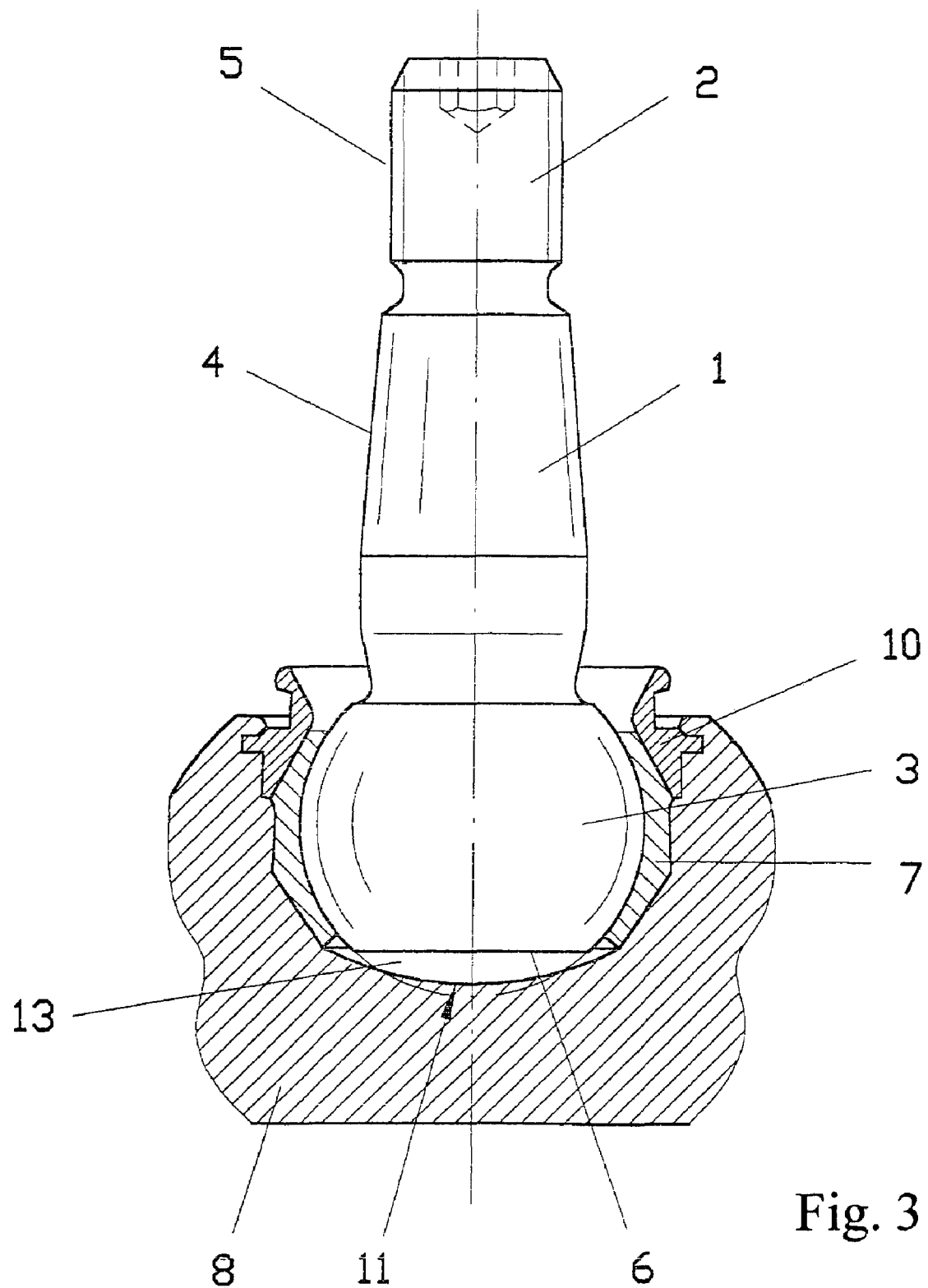
FIG. 3 is a sectional view through a ball-and-socket joint with a stop device according to the present invention according to variant 2.
Figure 4:
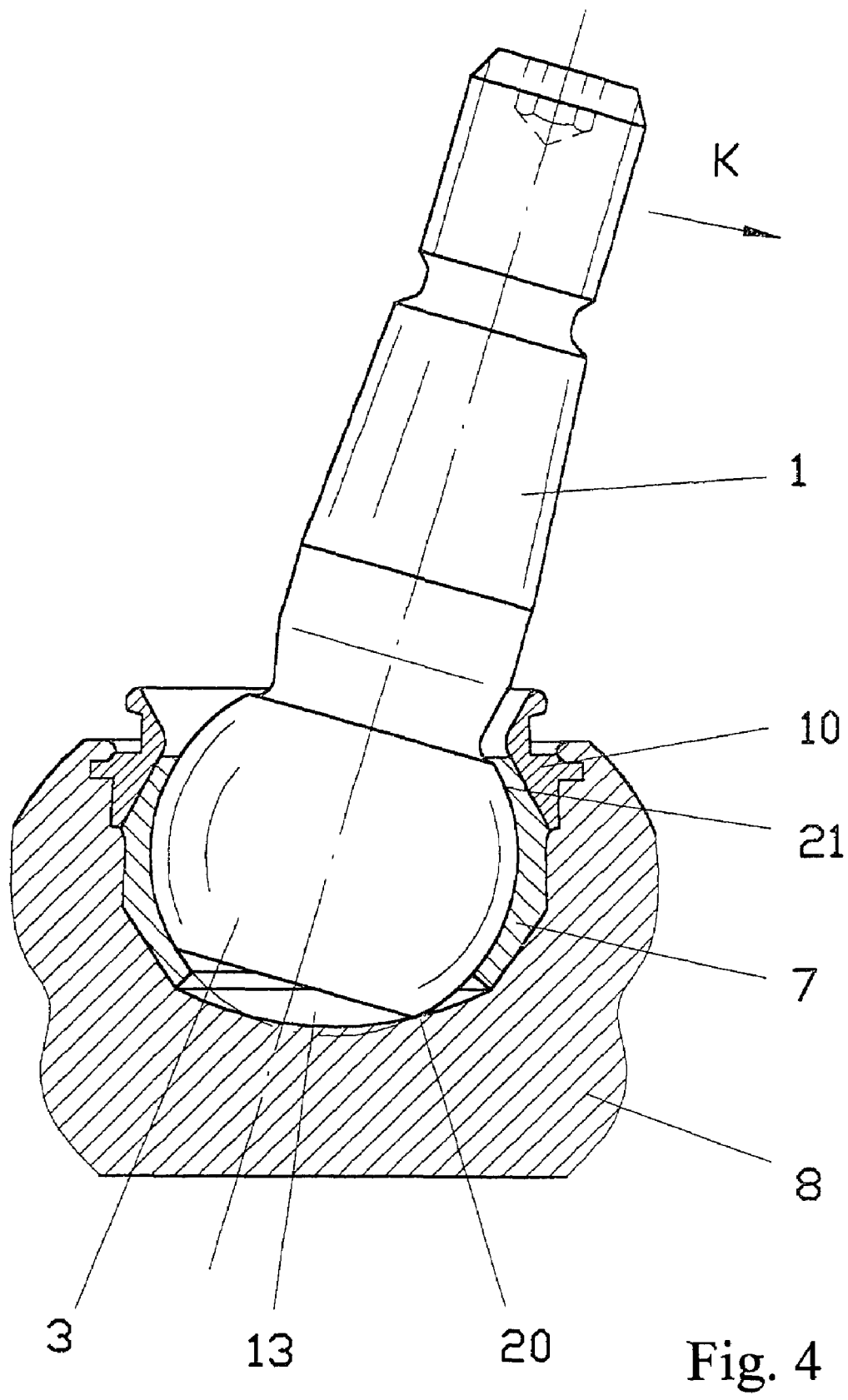
FIG. 4 is a sectional view through the ball-and-socket joint according to the present invention from FIG. 3 with the ball pivot pin deflected.

The ball-and-socket joint shown in FIGS. 3 and 4, in which the stop element is designed corresponding to the second solution variant, comprises essentially the same components as the ball-and-socket joint shown in FIGS. 1 and 2. Via the intermediary of a bearing shell 7, the joint area 3 of a ball pivot pin 1 is accommodated rotatably and tiltably in a joint housing 8 in this case as well. The bearing shell 7 and the joint area 3 are located here in a blind hole-like recess of the joint housing 8, which is closed by a closing ring 10 after the insertion of the aforementioned two components. The ball pivot pin 1 has, analogously to the view in FIG. 1 or 2, a pivot area 2, with which the ball pivot pin 1 can be fixed on a body part, which is not shown here in greater detail for the sake of clarity. The stop device, by which the tilting movement of the ball pivot pin 1 is limited, comprises a special design of the bottom area 11 of the joint housing 8 in the embodiment variant according to FIGS. 3 and 4.

Corresponding to the second variant of the idea of the invention, the bottom area 11 is designed in the form of a hollow sphere, the radius of the hollow sphere having a greater dimension than the radius of the sphere of the joint area 3 of the ball pivot pin 1. This is illustrated in FIGS. 3 and 4 by representing the spherical joint area 3 by dash-dot line beyond the flattened area 6, which is likewise present in this ball pivot pin 1, as a result of which it becomes clear that the radius of the spherical bottom area 11 has a markedly higher value.

The mode of action of this special design of the bottom area 11 becomes clear from FIG. 4, which shows the ball-and-socket joint with the ball pivot pin 1 tilted. The air gap 13, which is usually present between the flattened area 6 of the ball pivot pin 1 and the surface of the bottom area 11, decreases analogously to the view in FIG. 2 until the ball pivot pin 1 comes into contact with the bottom area 11 of the joint housing 8 in the area of the contact point 20. A further deflection in the direction of arrow K leads to a displacement of the contact point 20 along the arch of the bottom area 11, so that a migration of the contact area 21 also begins at the same time in the upper area of the bearing shell adjacent to the closing ring 10. Thus, it is common to both embodiment variants that the deflection of the ball pivot pin 1 in the direction of arrow K after it comes into contact at the contact point 20 contributes to a raising, however slight, of the ball pivot pin 1 because of the special design of the bottom area, as a result of which a reduction of the surface pressure is brought about in the sensitive upper area of the bearing shell 7, contrary to the solutions known from the state of the art.

While specific embodiments of the invention have been shown and described in detail to illustrate the application of the principles of the invention, it will be understood that the invention may be embodied otherwise without departing from such principles.

The invention claimed is:

1. A ball-and-socket joint, for chassis suspensions and/or steering mechanisms of motor vehicles, the ball-and-socket joint comprising:
   a joint housing defining an open end and with a single part forming side walls and defining an integral closed bottom area;
   a pivot pin accommodated rotatably and tiltably in said joint housing with a joint area at one free end, said joint area having an essentially spherical shape with a flattened area end face, said flattened area being planar and not forming a recess in said joint area, said pivot pin being fixed statically to a body part with a pin connection area located at another free end; and
   a stop device for limiting the tilting movement of said pivot pin unitarily and rigidly formed with said housing, said stop device having a stop element arranged rotationally symmetrically to the longitudinal axis of the ball-and-socket joint with said stop element formed by said bottom area of said joint housing and cooperating with said flattened area of said pivot pin, said stop element comprising a rotationally symmetrical arch with a constant radius ball surface form projecting spherically, in a direction of said flattened area, over said bottom area of the joint housing.

2. A ball-and-socket joint according to claim 1, wherein said rotationally symmetrical arch with a ball surface has an arch ball surface center and said joint area having an essentially spherical shape has a ball joint center, said ball joint center being on an opposite side of said arch from said ball surface center.

3. A ball-and-socket joint according to claim 1, wherein said pivot pin may be pivoted between a non-inclined position and a fully inclined position in which said stop element is in contact with said flattened area and wherein said stop element is not in contact with said flattened area in said non-inclined position of said pivot pin.

4. A ball-and-socket joint according to claim 3, wherein said flattened area is perpendicular to a longitudinal axis of said pivot pin.

5. A ball-and-socket joint according to claim 4, wherein said flattened area faces said rotationally symmetrical arch.

6. A ball-and-socket joint according to claim 4, wherein said ball surface form is made in one piece with the joint housing.

7. A ball-and-socket joint according to claim 4, wherein said rotationally symmetrical arch has an arch apex arranged on the longitudinal axis of said ball and socket joint.

8. A ball-and-socket joint, for chassis suspensions and/or steering mechanisms of motor vehicles, the ball-and-socket joint comprising:
   a joint housing with a closed bottom area;
   a pivot pin accommodated rotatably and tiltably in said joint housing with a joint area at one free end and a pin area extending to an opposite free end, said joint area having a substantially spherical shape except for a flat region at an end side and a pin connection to said pin area located opposite said end side, said spherical shape having a constant radius from a pivot center, said flat region being perpendicular to a direction of extension of said pin area; and
   a stop device for limiting the tilting movement of said pivot pin in said housing, said stop device having a stop element-arranged rotationally symmetrically to the longitudinal axis of the ball-and-socket joint defined by said bottom area of said joint housing and cooperating with said end side joint area of said pivot pin, said stop element in said bottom area of said joint housing having a hollow spherical shape surface with a constant radius of said hollow spherical shape surface being greater than said radius of the spherical shape of said joint area of said pivot pin, said hollow spherical shape surface having a hollow shape surface center, said hollow shape surface center and said pivot center of said joint area being on a same side of said hollow spherical shape surface.

9. A ball-and-socket joint, for chassis suspensions and/or steering mechanisms of motor vehicles, the ball-and-socket joint comprising:
   a joint housing;
   a pivot pin accommodated rotatably and tiltably in said joint housing with a joint area at one free end, and a pin connection located at another free end; and
   a stop device for limiting the tilting movement of said pivot pin in said housing, said stop device having a stop element-arranged rotationally symmetrically to the longitudinal axis of the ball-and-socket joint in a bottom area of said joint housing and cooperating with said joint area of said pivot pin, said stop element in said bottom area of said joint housing having a hollow spherical shape surface of a constant radius, said constant radius of said hollow spherical shape surface being greater than a radius of a spherical shape of said joint area of said pivot pin, said hollow spherical shape having a hollow shape center located on a joint area side of said hollow spherical shape surface, said joint area having an essentially spherical shape with a flattened area and said flattened area faces the hollow spherical shape surface.

10. A ball-and-socket joint according to claim 9, wherein said hollow spherical shape surface is made in one piece with said joint housing.

11. A ball-and-socket joint according to claim 9, wherein said flattened area is perpendicular to a longitudinal axis of said pivot pin.

12. A ball-and-socket joint according to claim 9, wherein said stop element form is made in one piece with the joint housing.

13. A ball-and-socket joint according to claim 9, wherein said hollow spherical shape surface has a spherical shape surface apex arranged on the longitudinal axis of said ball and socket joint.

14. A ball-and-socket joint according to claim 9, wherein said pivot pin may be pivoted between a non-inclined position and a fully inclined position in which said stop area is in contact with said flattened area and wherein said stop area is not in contact with said flattened area in said non-inclined position of said pivot pin.

* * * * *